(12) United States Patent
Van Assche

(10) Patent No.: US 7,437,610 B2
(45) Date of Patent: Oct. 14, 2008

(54) CHECKING OF THE ATOMICITY OF COMMANDS EXECUTED BY A MICROPROCESSOR

(75) Inventor: Gilles Van Assche, Brussels (BE)

(73) Assignee: Proton World International N.V., Zaventem (BE)

( * ) Notice: Subject to any disclaimer, the term of this patent is extended or adjusted under 35 U.S.C. 154(b) by 512 days.

(21) Appl. No.: 11/142,963

(22) Filed: Jun. 2, 2005

(65) Prior Publication Data

US 2005/0289411 A1    Dec. 29, 2005

(30) Foreign Application Priority Data

Jun. 2, 2004    (FR)    .................... 04 51087

(51) Int. Cl.
*G06F 11/00* (2006.01)
(52) U.S. Cl. ....................................... 714/25
(58) Field of Classification Search ............. 714/25, 714/26, 32, 37, 45; 712/241, 244, 2
See application file for complete search history.

(56) References Cited

U.S. PATENT DOCUMENTS 6,535,997 B1 * 3/2003 Janson et al. ............... 714/15
6,539,448 B1 * 3/2003 Deng .......................... 710/260

2005/0223279 A1 * 10/2005 Malpani et al. ............... 714/17
2005/0269400 A1 * 12/2005 Fontaine ....................... 235/380

OTHER PUBLICATIONS

French Search Report from French Patent Application No. 04/51087, filed Jun. 2, 2004.
Engelbert Hubbers and Erik Poll: "Reasoning About card Tears and Transactions In Java Card" Proc. Of Fundamental Approaches To Software Engineering—Fase' 04, vol. 2984, Mar. 2004, pp. 114-128, XP002314878.
Reiner Hahnle and Wojciech Mostowski: "Verification of Safety Properties in the Presence of Transactions" Cassis' 04 Post Workshop Proceedings, vol. 3362, March 224, pp. 151-171, XP002314879.
Kohler W.H. A Survey of Techniques For Synchronization And Recovery In Decentralized computer Systems: ACM Computing Surveys, New York, NY, US, vol. 13, No. 2, Jun. 1981, pp. 149-183, XP000747618.

* cited by examiner

*Primary Examiner*—Nadeem Iqbal
(74) *Attorney, Agent, or Firm*—Lisa K. Jorgenson; James H. Morris; Wolf, Greenfield & Sacks, P.C.

(57) ABSTRACT

A method and a system for checking the atomic character of at least one command executed by a microprocessor of an electronic component including at least one rewritable non-volatile memory, including: selecting a command including at least one updating of at least one piece of data in the non-volatile memory; executing this command several times; interrupting each execution at a different time of its development; and checking, after each interrupt, the coherence of the data in the non-volatile memory with respect to at least one predetermined authorized state.

25 Claims, 3 Drawing Sheets

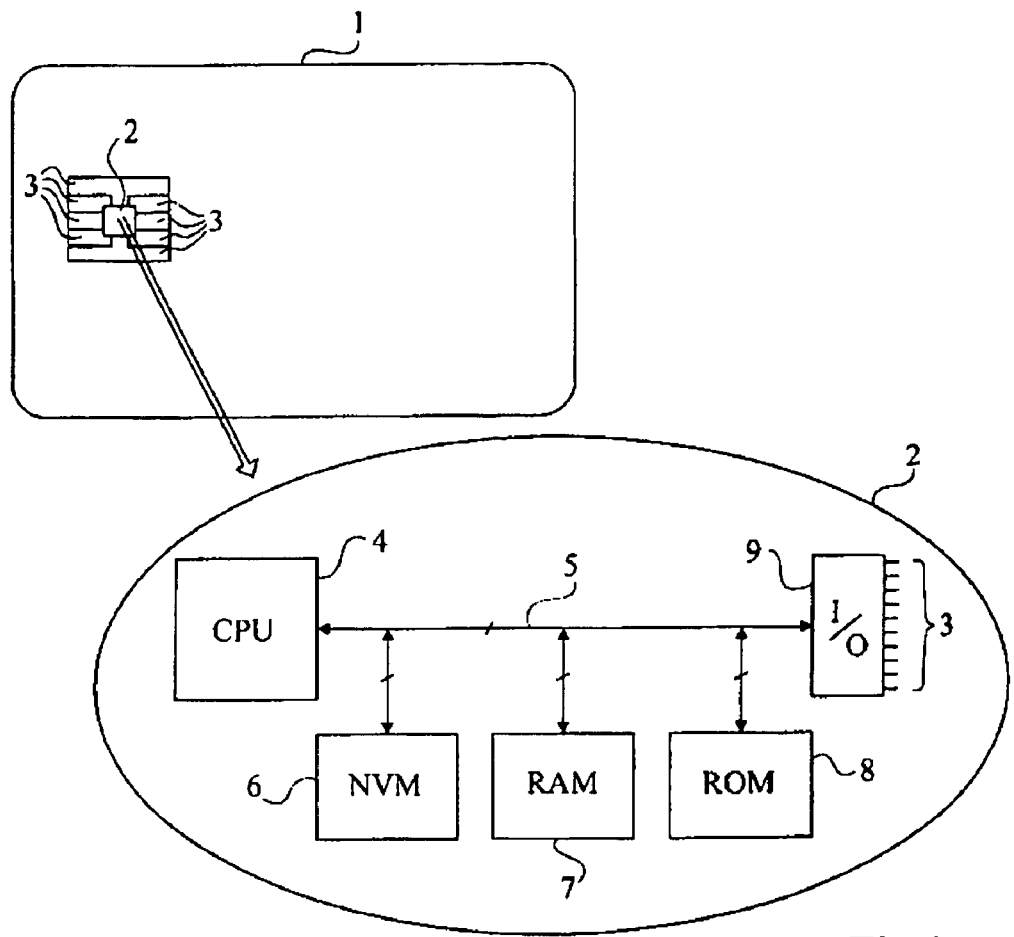
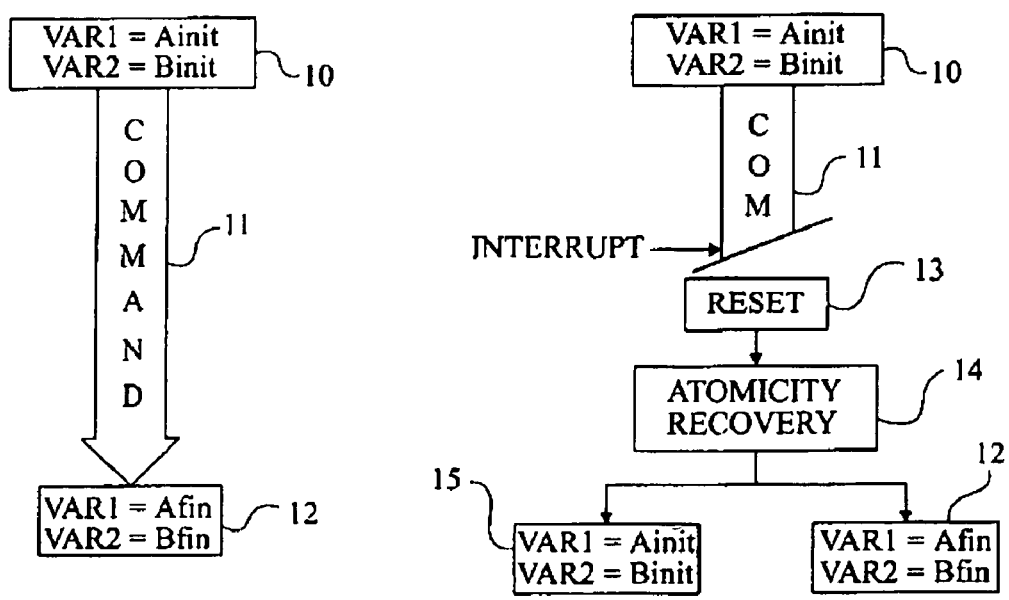
Fig 1
Fig 2A
Fig 2B

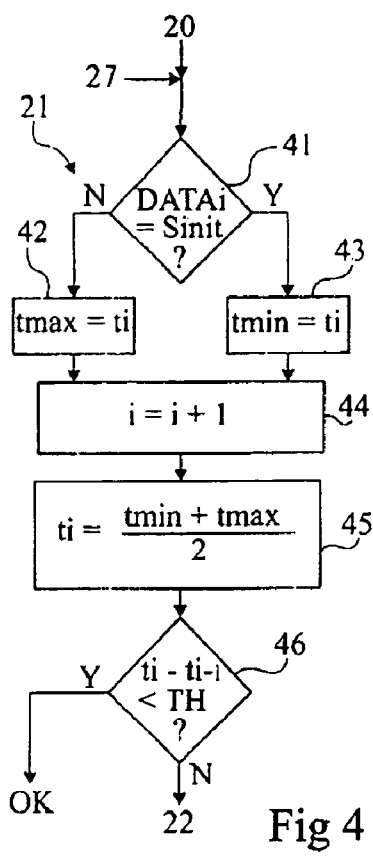
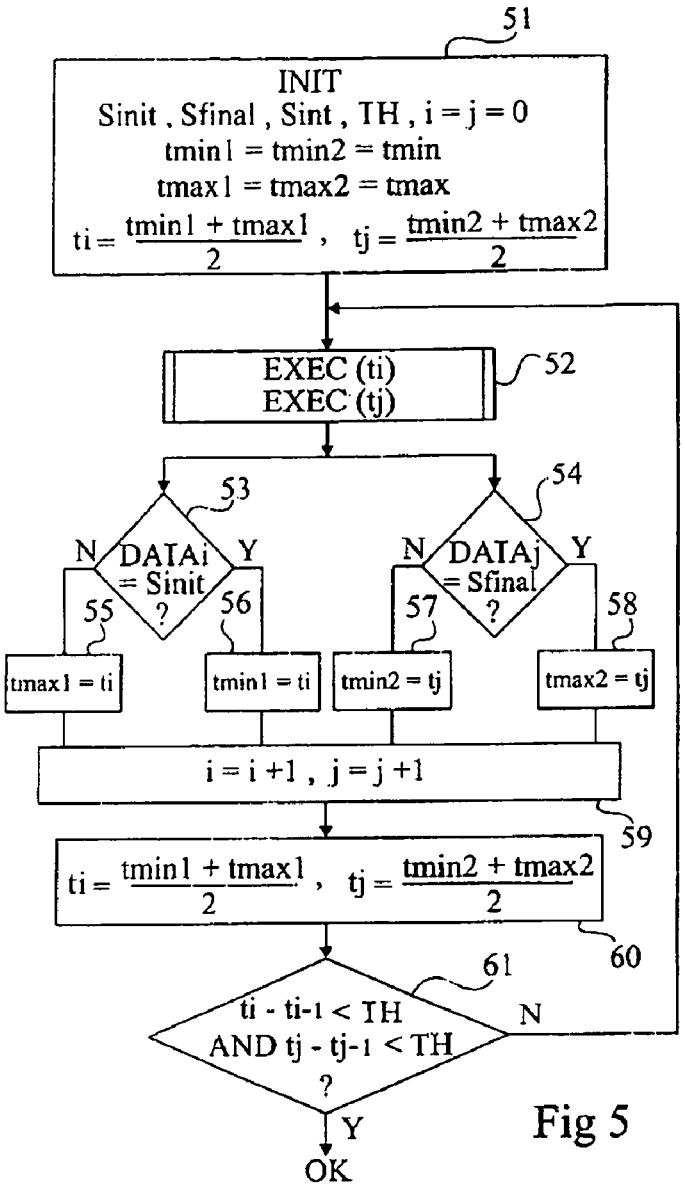
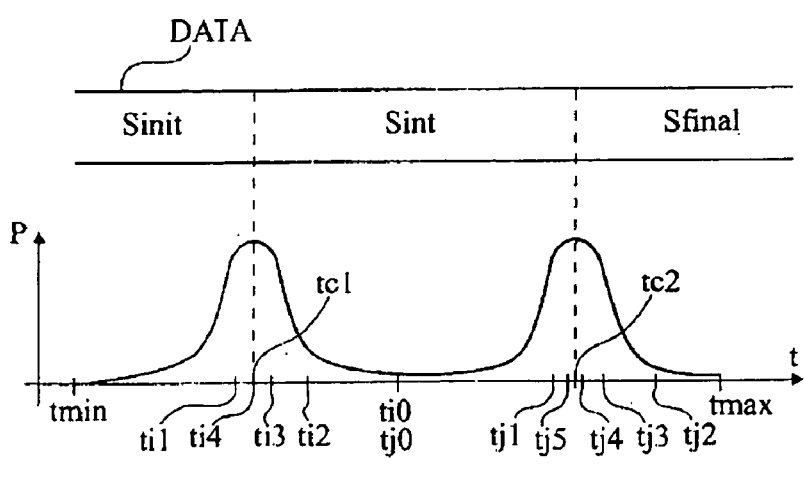
Fig 4
Fig 5
Fig 6

CHECKING OF THE ATOMICITY OF COMMANDS EXECUTED BY A MICROPROCESSOR

BACKGROUND OF THE INVENTION

1. Field of the Invention

The present invention generally relates to the field of microcontrollers integrated in electronic components and, more specifically, the checking of the atomic character of the commands or transactions (instruction series) executed by this microcontroller.

2. Discussion of the Related Art

The atomic character of a transaction means that one or several variables implemented by this transaction do not risk being provided with any state in case this transaction is interrupted. The simplest case is a variable having an initial state and a final state. The atomicity of a transaction implementing this variable then means that, even in case of an interruption of the transaction, the variable does not risk being provided in an intermediary state.

An example of application of the present invention is the field of smart cards with or without contacts equipped with a microcontroller.

FIG. 1 schematically shows a card 1 with chips 2 of the type to which the present invention applies. In the example of FIG. 1, the smart card is a card with contacts 3. However, the presence or the absence of a contact by no means modifies the present invention. In the case of a contactless smart card, contact recovery metal pads 3 are replaced or completed by an antenna of an oscillating circuit for communicating with a terminal emitting an electromagnetic field.

As illustrated in FIG. 1, a microcontroller chip 2 essentially comprises a central processing unit 4 communicating, via one or several buses 5, with memories among which, especially, a rewritable non-volatile memory (NVM) 6, for example, of type $E^2$PROM. Chip 2 also comprises a RAM 7 for executing current calculations and a ROM 8 generally containing the programs executed by central unit 4. Eventually, central unit 4 is also connected (in this example by bus 5) to an input/output circuit 9 (I/O) which is here further connected to contacts 3. In the case of a contactless chip (electromagnetic transponder), the input/output circuit modulates a carrier and is thus connected to the oscillating circuit forming an antenna.

Of course, the smart card (more generally, the electronic component comprising the integrated microcontroller) may comprise other components and circuits according to the applications.

FIGS. 2A and 2B very schematically illustrate the atomic character of a command executed by a microcontroller. FIG. 2A illustrates the development of the command with no interrupt. FIG. 2B illustrates this development in the presence of an interrupt. The interrupt is generally, in the case of a contactless smart card, a disappearing of the microcontroller power supply. More generally, it is any disturbance resulting in a malfunction of the microcontroller and causing its reset.

In the example of FIG. 2A, a command implementing two variables VAR1 and VAR2 respectively having initial states Ainit and Binit and supposed to take, at the end of the execution of the command, final states Afin and Bfin, is assumed.

Variables VAR1 and VAR2 are stored in non-volatile memory 6. At the beginning of the command execution (block 10), variables VAR1 and VAR2 are in their respective initial states Ainit and Binit. Assuming that the command (block 11, COMMAND) is normally executed, the non-volatile memory contains, at the end of the execution for variables VAR1 and VAR2, their respective final states (block 12).

In the case (FIG. 2B) where an interrupt INTERRUPT occurs during execution of command 11, for example, by the removal of the smart card power supply, a specific procedure is then implemented.

This procedure consists, on reset (block 13, RESET) due to the powering back on of the card, in a recovery of the atomicity (block 14, ATOMICITY RECOVERY) of the transaction. This procedure results in this example in finding back, in the non-volatile memory, either the final states (block 12) of the variables, or their initial states (block 15).

In the above example, it is assumed that, for the considered command, the transaction is considered as being atomic, provided for the updating of variables A and B to be performed for the two variables or not at all. Accordingly, an intermediary state in which a single one of the two variables is updated is considered as an invalid or unauthorized state. It should be noted that the updating of a variable or data is performed in practice by one or several operations of writing into the non-volatile memory.

Intermediary states may if desired be considered as coherent or authorized. For example, assuming a transaction processing four variables A, B, C, and D distributed in two groups, a respecting of the atomic character of the transaction may consist of an updating of variables two by two. In this case, four situations are considered as being logically coherent: the four variables A, B, C, and D have their initial values (no updating); the four variables A, B, C, and D have their final values (correct updating); variables A and B have their final values and variables C and D have their initial values; and variables C and D have their final values while variables A and B have their initial values.

For the atomic character of the transaction to be respected, the states of the variables in the non-volatile memory and their combination must correspond to states considered as being logically coherent. In case of a transaction interrupt, the processor must thus be capable of restoring one of the coherent states or combinations.

There exist many techniques for recovering the atomicity of a transaction. For example, U.S. Pat. No. 6,535,997, which is incorporated herein by reference, describes a processor of execution of data transactions between an external system and a smart card in which a procedure for recovering the atomic character of the transaction is implemented.

A problem which is posed is to check the efficiency of such transaction atomicity recovery procedures.

A known technique consists of repetitively interrupting the smart card power supply at a regular interval, and of ensuring that the logically coherent states are always observed on powering back on.

A disadvantage of such a method is that, even by multiplying test operations, it brings no guarantee of reliability.

Further, the multiplication of test operations results in an often extended test time. This disadvantage is further increased by the significant number of commands to be tested.

SUMMARY OF THE INVENTION

The present invention aims at enabling checking of the atomic character of transactions or commands executed by a microprocessor of an electronic component, for example, a smart card. The present invention more specifically aims at checking the efficiency of the process of recovery of state(s) considered as logically coherent implemented by the microcontroller of the electronic component.

The present invention also aims at providing a solution compatible with smart card management systems.

The present invention also aims at providing a solution which requires no modification of existing smart cards.

The present invention also aims at providing a solution which is reliable for a relatively short checking time with respect to an examination at regular intervals.

To achieve these and other objects, the present invention provides a method for checking the atomic character of at least one command executed by a microprocessor of an electronic component comprising at least one rewritable non-volatile memory, comprising:

selecting a command comprising at least one updating of at least one piece of data in the non-volatile memory;

executing this command several times;

interrupting each execution at a different time of its development; and checking, after each interrupt, the coherence of the data in the non-volatile memory with respect to at least one predetermined authorized state.

According to an embodiment of the present invention, the checking step is performed at the end of an atomicity recovery process implemented by the microprocessor.

According to an embodiment of the present invention, the successive times of execution of said command are selected to range between two preceding times having resulted in different authorized states, by applying a dichotomy algorithm.

According to an embodiment of the present invention, the selection of said successive times is random between said two preceding times having resulted in different authorized states.

According to an embodiment of the present invention, the checking is considered as having failed as soon as an obtained state is not an authorized state.

According to an embodiment of the present invention, the checking is considered as having succeeded when the current time is separated from the preceding time by a predetermined time threshold.

According to an embodiment of the present invention, the command is executed once again at a different time selected according to previous times as long as the result of the comparison is correct and the interval between two successive times is greater than a predetermined time threshold.

According to an embodiment of the present invention, said time threshold is a function of the duration of a writing into the non-volatile memory.

According to an embodiment of the present invention, after each interrupt, the state of the datum in the non-volatile memory is compared with at least one predetermined authorized state.

According to an embodiment of the present invention, the method is reproduced for several different commands selected to be representative of the operation of the electronic component.

According to an embodiment of the present invention, the electronic component is a smart card.

The present invention also provides a system for checking the atomicity of at least one command executed by an electronic component of smart card type.

The foregoing objects, features, and advantages of the present invention, as well as others, will be discussed in detail in the following non-limiting description of specific embodiments in connection with the accompanying drawings.

BRIEF DESCRIPTION OF THE DRAWINGS

FIGS. 1, 2A, and 2B, previously described, are intended to discuss the state of the art and the problem to solve;

FIG. 4 illustrates a first example of selection of a test time according to an embodiment of the present invention;

FIG. 5 illustrates a second example of selection of a test time according to an embodiment of the present invention; and FIG. 6 illustrates the distribution of test times in the execution of a transaction by the implementation of the present invention.

DETAILED DESCRIPTION

Figure 3:
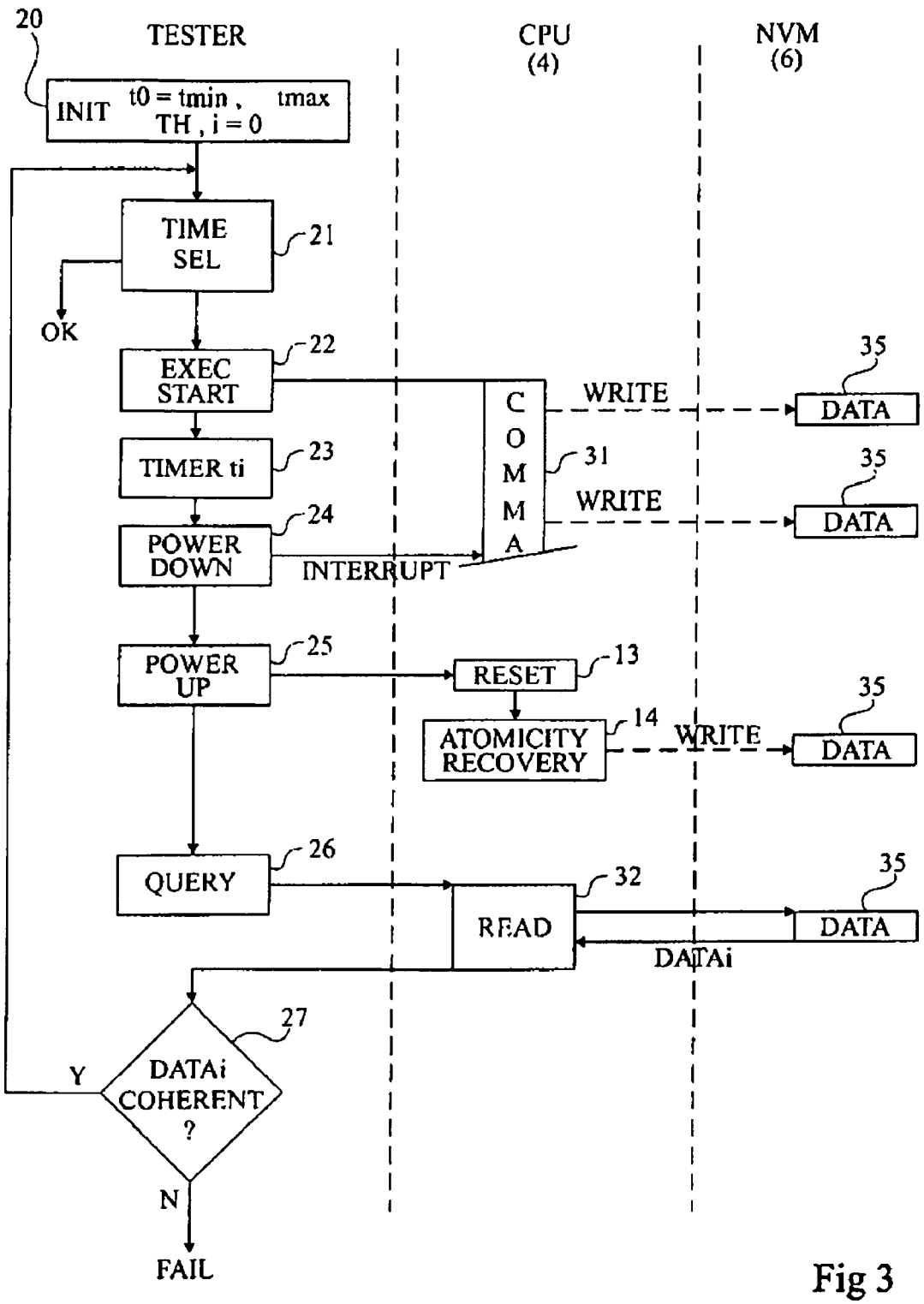
FIG. 3 very schematically shows in the form of blocks an embodiment of the method for checking the atomic character of commands executed by a microprocessor according to the present invention.

The same elements have been designated with the same references in the different drawings. For clarity, only those elements and steps which are necessary to the understanding of the present invention have been shown and will be described hereafter. In particular, the commands executed by the microcontroller have not been described in detail. The present invention is compatible with any conventional command, provided that it comprises at least one instruction for updating data in a non-volatile memory.

A feature of the present invention is to select, in the execution by a microcontroller of a transaction, the atomicity of which is desired to be checked, interrupt times selected to be particularly critical.

The present invention originates from an analysis of the critical steps or instructions of a transaction in terms of respect of its atomic character.

The present inventor has found that, in a microcontroller which is desired to respect a transaction atomicity criterion, the critical steps are in fact the times of writing into the non-volatile memory. Indeed, if the writing has not occurred yet, the data have not been updated and the atomicity recovery procedures will take, a priori easily, the initial value(s) of the variables. If however the data have already been updated, such atomicity recovery procedures will take, a priori easily, the final value(s). Conversely, the critical times are those where the microprocessor (central unit 4, FIG. 1) writes into the non-volatile memory.

An advantage which already appears from this specific test time selection is a considerable time gain in the test execution. Indeed, the times of writing into the non-volatile memory generally represent but a few percents of the command execution time.

For simplification, the present invention will be described in relation with the writing of a piece of data. However, the present invention also applies to the writing of several data, the number of which depends on the executed command.

According to the present invention, the test comprises executing several times a same transaction or command within which is performed at least one updating of a piece of data in the non-volatile memory associated with the microprocessor. Each time this command is executed, it is interrupted at a different time of its development and the state of the datum in the non-volatile memory is compared with predetermined authorized states (considered as logically coherent). The coherence of the states from the point of view of atomicity corresponds either to predetermined values, or to a logic coherence (for example, that it effectively is a date, a total monetary value, etc.).

According to a preferred embodiment of the present invention, the times of interruption of the command execution are automatically determined during the very execution of the command, preferably, by a dichotomy algorithm. Thus, it is not necessary to know in advance the development of the tested command to be capable of checking the atomicity of this command.

For example, in a smart card applied to an electronic purse, a variable contained in a non-volatile memory element is the counter containing the balance of the electronic purse. In this case, the states coherent for the data formed by the counter value are the balances before and after a transaction likely to be taken by the counter. The dichotomy algorithm will then focus the test times, for example, on the bit-to-bit carries by choosing to execute a command with adequate debit values, and more generally on times considered as critical for the updating.

Taking the example of the electronic purse, another variable may be concerned by the atomicity. Said variable is a transaction number which must be updated coherently with the balance. The two coherent states then are the old number—old balance and new number—new balance couples.

A test device usable according to the present invention is any computer device likely to exchange information with the electronic component to be tested. For example, it will be a smart card reader, equipped with a specific test program.

The present invention will be described hereafter with an example of application to smart cards. It should however be noted that it applies whatever the tested electronic component, provided that it comprises a central processing unit and at least one non-volatile memory.

The checking performed by the present invention is preferably performed on a test smart card, for example, a smart card sampled from each manufacturing batch. This test may also be performed on a pilot product before any series production.

The selection of the commands used for the test procedure depends on the application for which the smart card is intended. It is desired to test commands corresponding to cases representative of the operation of this card. For example, the commands or transactions considered as representative in functional tests performed on smart cards of the considered type may be imitated. Such tests are conventional and include checking the correct operation of a smart card.

FIG. 3 illustrates, in the form of blocks, an embodiment of the checking method of the present invention. This drawing illustrates the steps implemented in an application of the method of the present invention respectively on the tester side (TESTER), on the side of the CPU 4 of the electronic component (for example, the smart card), and on the side of non-volatile memory 6 (NVM).

According to the present invention, the test method starts with an initialization step (block 20, INIT) during which at least a maximum command execution time (tmax) as well as a time threshold (TH) forming the minimum time step between two test times are set. Preferably, a minimum time tmin from the beginning of the command execution is also set. This minimum time is, for example, selected to correspond to threshold TH, but may also be set to zero.

The maximum expected time is, preferably, set to tmax-TH if the exact duration of the command is known. If not, a time tmax greater than the maximum possible time of execution of the command will be selected.

Once this initialization is over, the method of the present invention selects (block 21, TIME SEL) an interrupt time in the future execution of the command. Different time selection modes are possible and examples will be described hereafter in relation with FIGS. 4 to 6. For the time being, it will only be considered that an interrupt time $t_i$ comprised between tmin and tmax is selected.

The tester then sends, to the smart card (block 22, EXEC START), an instruction for starting the execution of the considered command (block 31, COMMAND) at the same time as it starts a time counter (block 23, TIMER $t_i$) counting the time down to time $t_i$. During the command execution, writings WRITE into the NVM memory (block 35, DATA) occur at unknown times.

As soon as time $t_i$ has been reached, the tester starts an interrupt INTERRUPT of the command.

According to a preferred embodiment, this interrupt comprises a cutting off the card supply (block 24, POWER DOWN). This enables very accurately reproducing the conditions in which interrupts are likely to occur during the card lifetime.

The smart card is then powered back up (block 25, POWER UP) by the tester. The time interval for which the card is not powered is selected to be sufficient to require, on the card side, a reset and atomicity recovery procedure. Thus, as soon as the card is powered back up, it conventionally performs a reset (block 13, RESET) and a procedure (block 14, ATOMICITY RECOVERY) for recovering the atomicity of the command. If necessary, this procedure results in a partial or total writing (WRITE) into the NVM memory of a piece of data (block 35, DATA).

After a time interval selected to leave time to the card to end its procedure 14, the tester sends a query (block 26, QUERY) of the variable(s), the atomicity of which must be preserved by the command execution. The time interval between blocks 25 and 26 is either set by the tester to be greater than the maximum duration of a reset with an atomicity recovery on the card side, or triggered after the card has sent to the tester a signal indicative of the end of an atomicity recovery procedure. After query 26, the card (more specifically its central unit 4) executes an instruction for reading (block 32, READ) the concerned variable(s) from the NVM memory (block 35, DATA). In the example of FIG. 3, this comprises a reading block 35 which sends a value $DATA_i$, index i being in fact associated with the data by the tester to be put in correspondence with interrupt time $t_i$.

When the tester receives data $DATA_i$, it checks (block 27, $DATA_i$ COHERENT ?) its coherence as to the respect of the atomicity. If data $DATA_i$ is not coherent (N), the tester provides a failure indicator (FAIL) meaning that the smart card is not capable of reliably recovering the atomicity of the command. If however $DATA_i$ is coherent, the tester returns to block 21 of selection of another interrupt time and the steps described hereabove from step 21 are executed again with this new time.

On selection of the interrupt time, the tester determines whether it is necessary to perform new tests or if tests in a sufficient number have been performed. If so, it stops the test process and provides a reliability indicator OK.

The determination of the end of the test is, for example, performed when tests in a sufficient number have been performed in the vicinity of write time(s) in the non-volatile memory. These times are in practice unknown before the test. A simplified embodiment comprises ensuring that the test times closest to the determined write times are distant in time from each other by a value smaller than threshold TH, this threshold being determined according to the minimum granularity of a write operation by the central unit. For example, the threshold is smaller than the duration of a write operation. As an alternative, once a threshold TH equal to the duration of a write operation has been reached, a small number of tests (less than ten) is performed within the time range then obtained around the write time.

FIG. 4 illustrates a first simplified example of embodiment of the selection of interrupt times $t_i$ according to the present invention. The example of FIG. 4 applies to the case where the monitored command has, as coherent states, only an initial state Sinit and a final state Sfinal. In practice, several write phases will intervene in a command for which several coherent intermediary states may be acceptable. However, the simplification of FIG. 4 enables more clearly illustrating the present invention.

According to this example, the initialization step (20, FIG. 3) initializes a time t0 corresponding to minimum time threshold tmin, and index i as being equal to 0.

The timing diagram of FIG. 4 corresponds to the steps of block 21 of FIG. 3. Accordingly, the input in the timing diagram of FIG. 4 comes either from initialization block 20 or from loop end test 27.

The first step of the time selection comprises comparing (block 41, $DATA_i$=Sinit ?) data $DATA_i$ read from the memory with initial coherent state Sinit. If $DATA_i$=Sinit, then threshold tmin is set to the time for which the test has just been performed (block 43, tmin=$t_i$). Otherwise, threshold tmax is set to be equal to time $t_i$ (block 42, tmax=$t_i$).

Then (block 44, i=i+1), the index of the interrupt time is incremented by 1.

Interrupt time $t_i$ for the next execution, provided by block 21, is then calculated (block 45, $t_i$=(tmax+tmin)/2) as being the midpoint between the two thresholds. As an alternative, time $t_i$ is selected randomly between current times tmin and tmax. At the output of block 45, it is checked (block 46, $t_i$-$t_{i-1}$<TH ?) whether the interval between two successive times remains greater than threshold TH. If so (output N of block 43), time $t_i$ determined for the next execution of the command is used. However, if the interval is smaller than the threshold (output Y of block 46), this means that the test is over for the considered command and that no loss of atomicity has been found.

It should be noted that the selection of value Sinit or Sfinal on which test 41 is performed is of no importance. It is enough to invert the outputs of block 41 for a test on state Sfinal.

It can be seen that, since a single step of writing into the memories is involved in the considered command, the test execution will have, by successive iterations, the interrupt time converge towards the precise time where this writing occurs. It is in fact a simplified dichotomy algorithm.

FIG. 5 shows another example of selection of interrupt times in the case where an intermediary state Sint is considered as being coherent in the execution of the command. The flowchart of FIG. 5 should be compared with those of combined FIGS. 3 and 4.

A first initialization step (block 51) comprises taking into account initial state Sinit, final state Sfinal, and intermediary state Sint of the variable (DATA, block 35) processed by command 31 (FIG. 3), the atomic character of which is desired to be verified. A minimum time interval TH is also initialized, two minimum thresholds tmin1 and tmin2 are initialized as being equal to threshold tmin, two maximum thresholds tmax1 and tmax2 are initialized as being equal to threshold tmax, and two indexes i and j are initialized as being equal to 1 and two first interrupt times $t_i$ and $t_j$ are initialized as being both equal to (tmax+tmin)/2.

The definition of these interrupt times amounts to providing two times in the duration of execution of the command to be able, by a dichotomy algorithm, to focus the interrupts on the times of switching from state Sinit to Sint and from Sint to Sfinal. In the shown example, this amounts to applying the algorithm of FIG. 4 for each of the state switchings.

The command is then executed (block 52, EXEC($t_i$) EXEC ($t_j$)) for the two times $t_i$ and $t_j$. This execution amounts to performing steps 22 to 27 of FIG. 3 twice with the corresponding steps on the smart card side.

If test 27 fails (output N) for one or the other of data $DATA_i$ and $DATA_j$, a failure (FAIL) of the reliability of the atomicity recovery process is indicated.

In case of an affirmative output of block 27, it is returned to the timing diagram of FIG. 5. Two values $DATA_i$ and $DATA_j$ are however available since steps 22 and 27 have been executed twice respectively for interrupt times $t_i$ and $t_j$.

Respective values $DATA_i$ and $DATA_j$ are then separately compared (blocks 53, $DATA_i$=Sinit ? and block 54, $DATA_j$=Sfinal ?) with states Sinit and Sfinal. If datum $DATA_i$ is different from Sinit, threshold tmax1 is set to $t_i$ (block 55, tmax1=$t_i$). Otherwise (block 56, tmin1=$t_i$), threshold tmin1 is set to $t_i$. On the side of block 54, if datum $DATA_j$ is different from Sfinal, threshold tmin2 is set to $t_j$ (block 57, tmin2=$t_j$). Otherwise (block 58, tmax2=$t_j$), threshold tmax2 is set to $t_j$. The above steps successively reduce the intervals of selection of times $t_i$ and $t_j$ to have these times converge towards the times of writing into the non-volatile memory.

Indexes i and j are then incremented (block 59 i=i+1, j=j+1). Then (block 60, $t_i$=(tmin1+tmax1)/2 and $t_j$=(tmin2+tmax2)/2), times $t_i$ and $t_j$ are selected in the middle of the respective ranges set by the thresholds. Here again, the times may be randomly selected inside of the ranges.

Times $t_i$ and $t_j$ thus defined are compared (block 61, $t_i$-$t_{i-1}$< TH AND $t_j$-$t_{j-1}$<TH) with threshold TH to determine whether it is appropriate to execute a loop once again or if the smart card is reliable from the point of view of the atomicity of the considered command.

FIG. 6 illustrates the time selection described in relation with FIG. 5. FIG. 6 shows the time scale of execution of the command by the successive states taken by data DATA and the different test times. The successive times have been designated as $t_{i0}$, $t_{i1}$, $t_{i2}$, $t_{i3}$, $t_{i4}$, and $t_{j0}$, $t_{j1}$, $t_{j2}$, $t_{j3}$, $t_{j4}$, $t_{j5}$.

In practice, the number of tests is greater and a statistical distribution (full line in FIG. 6) focusing the performed interrupts on critical times tc1 and tc2 can be considered, to focus the checking on the times of writing into the non-volatile memory corresponding to the switchings between states Sinit and Sint and between states Sint and Sfinal.

This statistical distribution of the performed tests corresponds to that of a dichotomy algorithm which does not necessarily correspond to that of FIG. 5. For example, it may be chosen to implement a dichotomy algorithm such as described in work "The Art of Computer Programming" by Donald E. Knuth, vol. 3, $2^{nd}$ edition 1988 by Addison Wesley, pages 409 et seq., which is incorporated herein by reference.

Although the present invention has been described hereabove in relation with the monitoring of a single variable updated by the command, several variables may be monitored, their number depending on the executed command.

An advantage of the present invention is that it enables checking the atomic character of a command executed by a microprocessor without it being necessary to know in advance the details of implementation of this command and especially its times of writing into the non-volatile memory.

Another advantage of the present invention is that it is thus compatible with existing smart cards or other existing electric components to be tested.

Another advantage of the present invention is that it reduces or minimizes the number of tests to be performed to check the atomicity of the transactions of the smart card due to the implementation of the dichotomy algorithm to select the successive interrupt times.

Of course, the present invention is likely to have various alterations, modifications, and improvements which will readily occur to those skilled in the art. In particular, the practical implementation of the present invention by software means is within the abilities of those skilled in the art based on the functional indications given hereabove. Similarly, the determination of the representative commands for a given application is within the abilities of those skilled in the art based on the indications given hereabove and by imitating, for example, commands considered as representative in tests functional for this application.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for checking the atomic character of at least one command executed by a microprocessor of an electronic component comprising at least one rewritable non-volatile memory, comprising:
    selecting a command comprising at least one updating of at least one piece of data in the non-volatile memory;
    executing this command several times;
    interrupting each execution at a different time of its development; and
    checking, after each interrupt, the coherence of the data in the non-volatile memory with respect to at least one predetermined authorized state.

2. The method of claim 1, wherein the checking step is performed at the end of an atomicity recovery process implemented by the microprocessor.

3. The method of claim 1, wherein the successive times of execution of said command are selected to range between two preceding times having resulted in different authorized states, by applying a dichotomy algorithm.

4. The method of claim 3, wherein the selection of said successive times is random between said two preceding times having resulted in different authorized states.

5. The method of claim 1, wherein the checking is considered as having failed as soon as an obtained state is not an authorized state.

6. The method of claim 1, wherein the checking is considered as having succeeded after a first interrupt when a first time of the first interrupt is separated from a second time of a second interrupt preceding the first interrupt by a predetermined time threshold.

7. The method of claim 1, wherein the command is executed once again at a different time selected according to previous times as long as the data in the non-volatile memory is coherent with respect to at least one predetermined authorized state and the interval between two successive times is greater than a predetermined time threshold.

8. The method of claim 6, wherein said time threshold is a function of the duration of a writing into the non-volatile memory.

9. The method of claim 1, wherein after each interrupt, the state of the data in the non-volatile memory is compared with at least one predetermined authorized state.

10. The method of claim 1, reproduced for several different commands selected to be representative of the operation of the electronic component.

11. The method of claim 1, wherein the electronic component is a smart card.

12. A system for checking the atomicity of at least one command executed by an electronic component of smart card type, comprising:
    means for selecting a command comprising at least one updating of at least one piece of data in the non-volatile memory;
    means for executing this command several times;
    means for interrupting each execution at a different time of its development; and
    means for checking, after each interrupt, the coherence of the data in the non-volatile memory with respect to at least one predetermined authorized state.

13. A method for checking the atomic character of a command that updates at least one piece of data, the method comprising:
    interrupting a first execution of the command at a first time after beginning the first execution;
    after interrupting the first execution of the command, comparing a first stored value of the at least one piece of data with one or more authorized values of the at least one piece of data;
    interrupting a second execution of the command at a second time after beginning the second execution; and
    after interrupting the second execution of the command, comparing a second stored value of the at least one piece of data with the one or more authorized values of the at least one piece of data.

14. The method of claim 13, wherein the first time is selected to occur when a first interrupt time has elapsed since the beginning of the first execution, and wherein the second time is selected to occur when a second interrupt time has elapsed since the beginning of the second execution.

15. The method of claim 14, wherein the first interrupt time is selected to be between a first minimum time and a first maximum time from the beginning of the first execution.

16. The method of claim 15, wherein the first interrupt time is selected to be a random value between the first minimum time and the first maximum time.

17. The method of claim 13, wherein an atomicity recovery process is performed after the first execution is interrupted and before the first stored value is compared with the one or more authorized values.

18. The method of claim 13, further comprising:
    indicating failure of the checking if the first stored value is not equal to one of the one or more authorized values.

19. The method of claim 13, wherein the one or more authorized values comprises an initial value of the at least one piece of data prior to the beginning of the first execution and a final value that would result if the first execution were not interrupted.

20. The method of claim 19, further comprising:
    selecting a second minimum and a second maximum based on which one of the initial and final values is equal to the first stored value of the at least one piece of data;
    wherein the second interrupt time is selected to be between the second minimum and the second maximum.

21. The method of claim 20, wherein:
    when the at least one piece of data is equal to the initial value after interrupting the first execution, the second minimum is selected to be the first interrupt time and the second maximum is selected to be the first maximum;
    when the at least one piece of data is equal to the final value after interrupting the first execution, the second minimum is selected to be the first minimum and the second maximum is selected to be the first interrupt time.

22. The method of claim 14, wherein the first and second interrupt times are selected according to a dichotomy algorithm.

23. The method of claim 20, wherein the second interrupt time is selected to be a second random value between the second minimum and the second maximum.

24. The method of claim 14, further comprising:
indicating success of the checking if:
   the second stored value is equal to one of the one or more authorized values, and
   the first and second interrupt times differ by at most a threshold.

25. The method of claim 14, further comprising:
carrying out a third execution of the command, if:
   the second stored value is equal to one of the one or more authorized values, and
   the first and second interrupt times differ by at least a threshold.

* * * * *